UNITED STATES PATENT OFFICE.

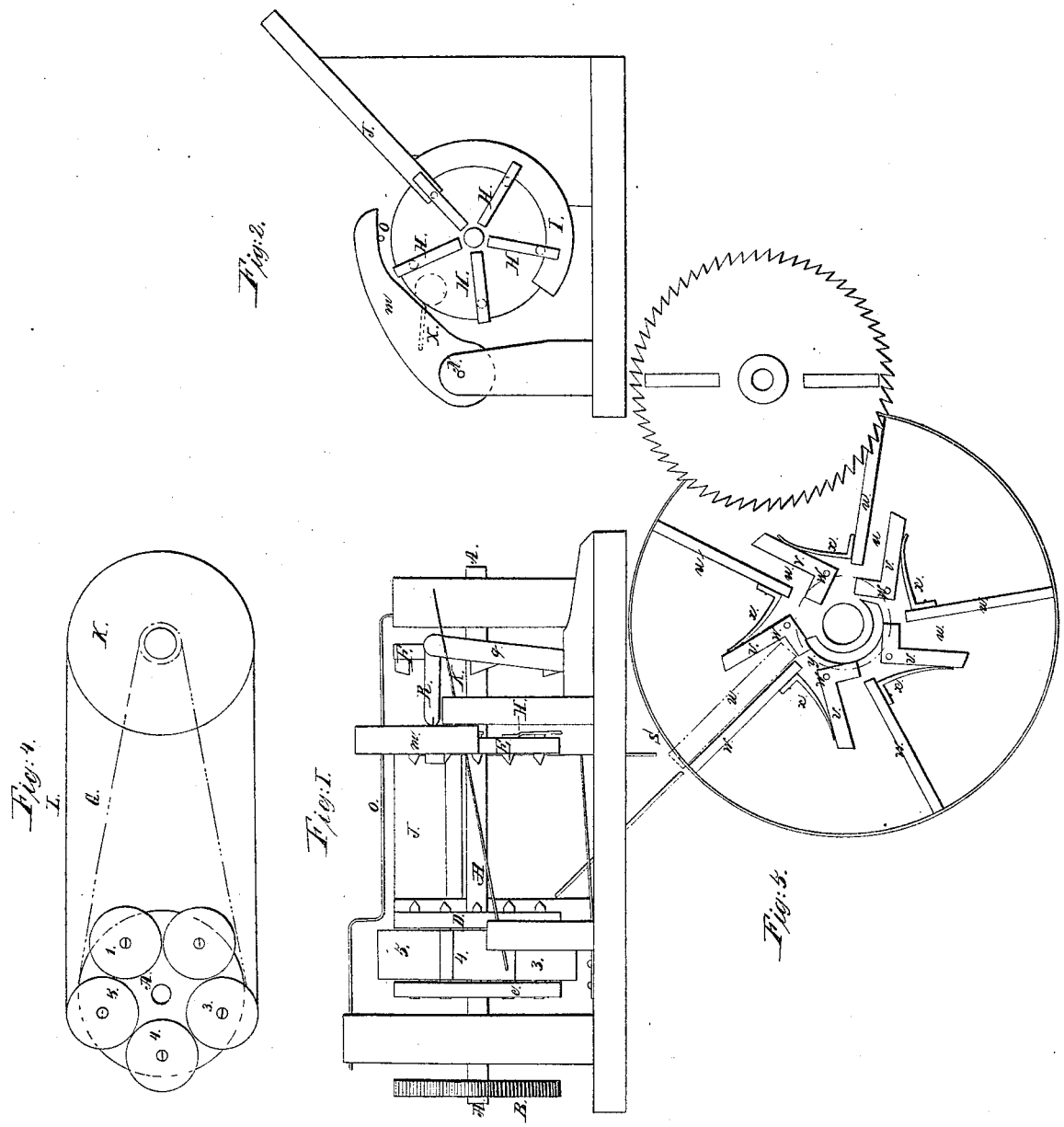
E. Parker,
Clothes Pin Machine.
Nº 14,110.    Patented Jan. 15, 1856.

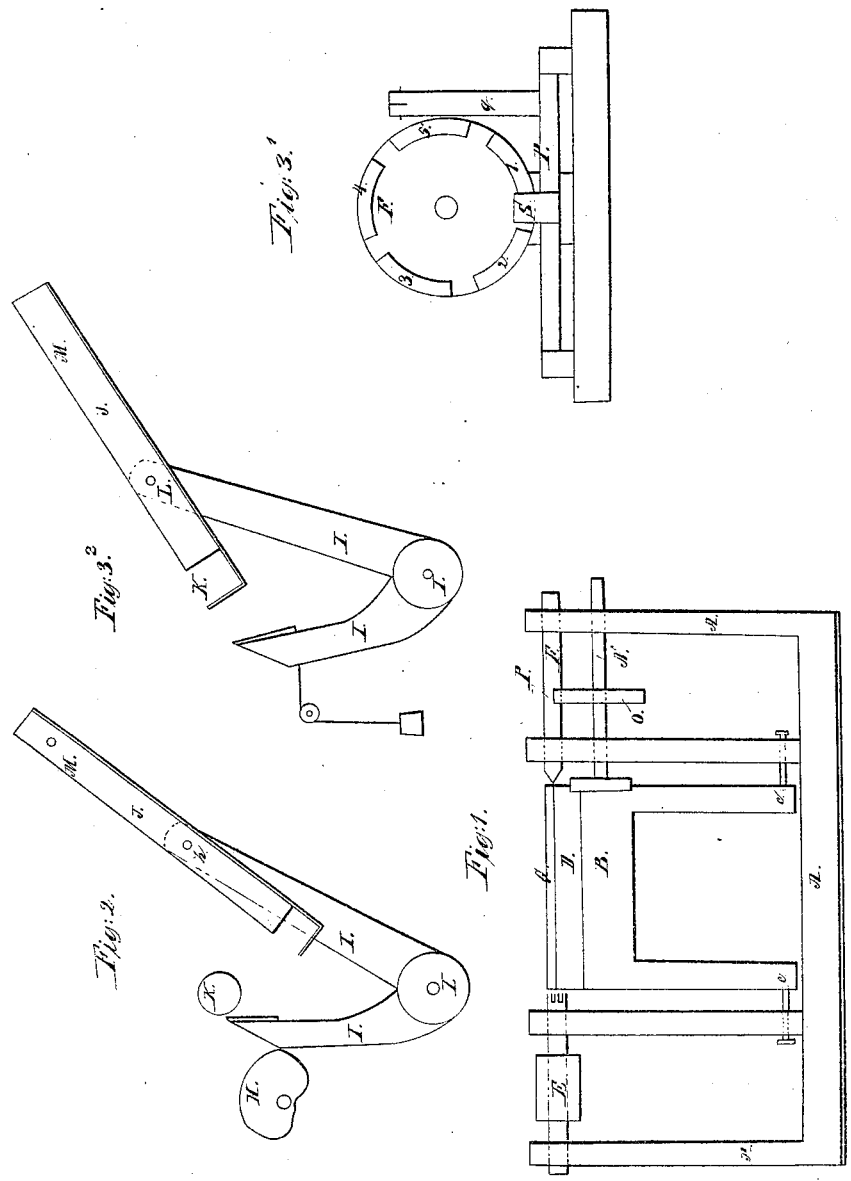
E. Parker,
Clothes Pin Machine.
Nº 14,110.   Patented Jan. 15, 1856.
2 Sheets—Sheet 2.

EPHRAIM PARKER, OF BURLINGTON, IOWA.

MACHINE FOR MAKING CLOTHES-PINS.

Specification of Letters Patent No. 14,110, dated January 15, 1856.

*To all whom it may concern:*

Be it known that I, EPHRAIM PARKER, of Burlington, county of Des Moines, and State of Iowa, formerly of Rock Island, State of Illinois, have invented a new and useful Improvement for Manufacturing Clothes-Pins and other Kinds of Short Cylinders of any Desirable Pattern; and I do hereby declare that the following is a full, clear, and exact description of the construction and operation of the same, reference being had to the accompanying drawings, making part of this specification.

My improvement consists in attaching to a common lathe for turning chair stuff, a cutter extending the whole length of the timber to be turned to which is connected a spout to contain the unturned work, also attaching a wheel and saw to slot and finish the clothes pins.

Figure 1 is a front view of a lathe with the cutter and cutter block.

To enable others skilled in the art to make and use my improvement I will proceed to describe it.

Fig. 1 is a front view of a lathe with the cutter and cutter block attached. A, A, are the lathe and tail block. B is the cutter block hung upon centers C, C. D is the cutter. E is the mandrel and pulley. F is the dead center. G is the timber to be turned, the lower half of which is hidden by the cutter.

Fig. 2 is an end view of the cutter block, cam and spout. H is the cam. I is the cutter block. J is the spout. K is the end of the pin upon the mandrel which has just been completed or turned. This figure shows the position it is in at the time a piece is completed and ready to drop.

Fig. 3 represents the position when the piece has dropped and the cutter has receded and the lower end of the spout has advanced so as to bring the lower pin in line with the mandrel and center. This spout marked J should be the width of the length of the "stuff" to be turned. It should have a bottom end and sides extending to the bottom pin. It should be so placed that all the pieces in it will slide down when the bottom one is withdrawn. The spout is attached to the cutter block at L by a pin and slot. The spout vibrates upon centers near the top at M.

The arm H is hung as seen in Figs. 1 and 2 upon a shaft parallel with the mandrel and near the top of the cutter block; the cam shaft is marked M, Fig. 1. The cam H revolves with a slow motion completing a piece at each revolution. Upon the cam shaft N is placed a wheel O. This wheel moves in a slot cut in the dead center at P. The surface of this wheel which slides in this slot is formed at the proper angle to move the dead center at the proper time to force the center toward the mandrel confining a pin while the chisel is turning the pin. The angle upon the wheel is then reversed so as to drop the pin when the work is done. This is done by forcing the center from the mandrel. If the turned piece is designed for a clothes pin it now drops, the head end first, into a wheel marked T, Fig. 5. This wheel is placed immediately below the falling pin upon a horizontal shaft at right angles to the mandrel. The front of this wheel is removed to present a better view of its formation. This wheel is divided into five equal divisions marked U of sufficient width to admit a pin between the two rims of the wheel. These ribs do not go direct from the surface to the center, but the inner ends are carried forward. When one of these divisions is directly under and in line with the falling pin, the pin will fall into the wheel upon the rib U. This wheel has a revolving motion, being geared to the cam shaft N and making one revolution while the shaft makes five, so that a division will be in the right place to receive each pin as it falls. To hold the pin in its place firmly in the wheel, jaws marked V are upon the upper side of the pin placed. These jaws are hung upon a pin marked W. The jaws project outward to the bottom of where the slot is to be. These jaws are forced upon the pins by springs marked X. Now as the wheel advances with the pin and has made about a fifth revolution it comes in contact with a rotary saw and as the pin advances past the saw it will be sawed and finished. To drop the pin when done, and to prevent the pin from going too deep into the wheel a short arm is attached to the lower end of the jaws at right angles with them and projecting backward a suitable distance and under the end of the pin. Now when the pin has passed the saw the end of this arm comes in contact with a stationary circular cam marked Y, which lifts the end toward the surface of the wheel forcing back the spring X opening the jaw and dropping the finished pin at the bottom. This arm slides upon the circular cam until it passes the place where it receives another pin. At this point when it has received another pin the cam terminates and the spring closes the jaw upon the pin as before.

The operation when at work will be as follows: The spout being filled with "stuff" the proper length the mandrel will have a constant rapid motion. The cutter being in position farthest from the work the lower end of the spout will be drawn forward so that the lower piece in the spout $m$, $k$, Fig. 3, will be in direct line between the mandrel and dead center. The cam being in slow constant motion it will force the cutter forward toward the timber. At this point the wheel $o$ sliding in the dead center makes an angle and forces the center toward the mandrel and a piece of timber being between them it will seize the piece and retain it upon the center at the end of the mandrel and in the dead center. As the cam revolves it presses up the cutter block carrying the lower end of the spout back from the mandrel. When it has passed clear of the lower pin which has been retained, the whole number of pieces in the spout will slide down and another take the place of the one retained. At this point the wheel $o$ makes a greater angle and forces the center still farther toward the mandrel. The wood will now come in contact with the spur upon the end of the mandrel, giving the timber a rapid circular motion. At this point the cam H has forced the cutter forward till it comes in contact with the revolving timber and continues to advance till the work is done. The cam now passes the cutter block and a spring or weight draws back the cutter block to its first position. As it commences to go back the wheel $o$ in the dead center makes a reverse angle and withdraws the center from the turned piece, which falls clear of the lathe. When the cutter is in place the farthest from the mandrel, the spout being attached to it will be in position with the lower pin in line between the mandrel and center and when the cutter is at work the spout will be farthest from the mandrel. The cutter and spout being connected together and as the cam forces them one way, a cylinder will be turned, and as the weight draws them the other, the turned piece will be discharged and another piece put in the lathe ready for the action of the cutter.

The edge of the cutter may be made in any form to cut any desirable figure, the edge of the wheel operating in the groove of the dead center being so formed as to move the center either way that may be required as the work progresses.

What I claim and desire to secure by Letters Patent is—

1. The attaching to a common lathe a cutter working parallel with the mandrel in connection with a spout, the same motion operating both the cutter and spout.

2. I also claim in connection with the above a wheel and saw the whole being a self acting machine taking square pieces of timber from the spout and converting them into cylinders and clothes pins at a single operation.

3. I claim the combination as above described or in any other combination substantially equivalent thereto.

EPHRAIM PARKER.

Witnesses:
JAIRUS RICHARDSON,
A. I. MESSENGER.